United States Patent [19]

Patel et al.

[11] 4,259,097
[45] Mar. 31, 1981

[54] FILTERING MEANS FOR ARC SUPPRESSING GAS SYSTEM

[75] Inventors: Amrut R. Patel, Brandon; Donald M. Hansen, Jackson, both of Miss.

[73] Assignee: Siemens-Allis, Inc., Atlanta, Ga.

[21] Appl. No.: 107,056

[22] Filed: Dec. 26, 1979

[51] Int. Cl.³ .................... B01D 50/00; F16K 15/00; F16K 17/04

[52] U.S. Cl. .................... 55/316; 55/385 R; 55/417; 55/485; 55/503; 55/DIG. 17; 210/136; 210/314; 210/339; 137/543.17; 137/543.21; 137/545; 210/323.2

[58] Field of Search ............. 55/186, 187, 190, 313, 55/314, 316, 417, 485, 503, 509, DIG.25, 323, 330, DIG. 17, 482, 385 R; 210/136, 314, 323 T, 339; 137/543.17, 543.21, 545

[56] References Cited

U.S. PATENT DOCUMENTS

| | | | |
|---|---|---|---|
| 1,737,706 | 12/1929 | Collins | 137/543.17 |
| 1,801,082 | 4/1931 | Hobart | 137/543.17 |
| 2,031,558 | 2/1936 | Clifford | 137/543.17 |
| 2,698,061 | 12/1954 | Jaubert | 55/316 |
| 3,397,786 | 8/1968 | Hultgren | 210/314 |
| 3,841,064 | 10/1974 | Hitchiner et al. | 55/417 |
| 3,900,400 | 8/1975 | Whitfield | 210/323 T |
| 4,040,442 | 8/1977 | Alexandre | 137/543.17 |
| 4,052,178 | 10/1977 | Frantz | 55/313 |

FOREIGN PATENT DOCUMENTS

| | | | |
|---|---|---|---|
| 186464 | 10/1955 | Austria | 210/314 |
| 521649 | 3/1931 | Fed. Rep. of Germany | 55/482 |
| 725420 | 8/1942 | Fed. Rep. of Germany | 55/485 |

*Primary Examiner*—David L. Lacey
*Attorney, Agent, or Firm*—Frederick W. Powers, III

[57] ABSTRACT

Arc suppressing gas in a high voltage circuit breaker system is collected, filtered and compressed. The compressed gas is passed through a series of oil and desiccant filters and returned to a high pressure vessel for storage. The oil and desiccant filtering system is combined in a single, separable casing including baffles and a check valve.

3 Claims, 3 Drawing Figures

FILTERING MEANS FOR ARC SUPPRESSING GAS SYSTEM

FIELD OF THE INVENTION

The present invention relates to gas collection systems, and more particularly to such systems having filtering means therein.

As transmission voltages have increased, the need for higher-capacity circuit breaker equipment has increased correspondingly. Historically, circuit breakers have been generally of three types; air, vacuum and oil-type. In the cases of air or oil, these fluids have formed the atmosphere in which the switch contact are operated.

With ever-increasing voltages, more and more attention has been directed toward means for interrupting the electric arc which is drawn across the separating contacts of a circuit breaker. Although electromagnetic fields have been used to drive the arc into arc chutes and the like to separate and interrupt it, this technique is not well adapted to use in high voltage power circuit breakers. Accordingly, various other approaches have been devised for physically interrupting the arc with a jet of air or gas. In recent years an arc quenching gas termed $SF_6$ (sulfur hexafluoride) has been used with increasing frequency. In order to extinguish the electric arc, the gaseous medium must be compressed. In many applications, this is achieved by means of an external compressor system which withdraws expended gas from the circuit breaker and compresses it into a holding vessel. When the circuit breaker is next operated a valve at the exit port of the holding vessel is opened and the previously-compressed gas rushes out, extinguishing the arc. Such circuit breakers are commonly known as "two-pressure" breakers.

The presence of arc products, oil, and other impurities in the circuit breaker environment causes them to find their way into the arc quenching gas. Further, when the gas is compressed previously-vaporized foreign matter condenses, forming a residue which must be removed from the gas before it is re-used. For this reason has it been found necessary to provide two-pressure gas systems with elaborate filtering systems to maintain the purity of the arc quenching gas.

Although filters per se have been known for many decades in various environments, the extremely high voltages and pressures involved make the purity of arc quenching gases particularly critical. Further, since circuit breakers using such systems are frequently installed in remote locations and serviced infrequently, the integrity of the gaseous system must be extremely high. This had let to the incorporation of elaborate and expensive filtering systems which add to the complexity, and therefore cost, of two-pressure circuit breakers. It is accordingly an object of the present invention to provide improved filtering means for the arc quenching gas of a circuit breaker system.

Another object to the invention is to provide a simplified, unitary filter system for compressed arc quenching gas.

SUMMARY OF THE INVENTION

Briefly stated, in accordance with one aspect of the invention the foregoing objects are achieved by providing a casing having two opposed sections, and a separable partition which engages the open ends of the sections. Oil and desiccant filters are placed in the opposed casing sections, and held in place by spring pressure. Each filter is comprised of two colinear sections with an imperforate baffle therebetween. A check valve is disposed in the partition for maintaining high pressure in the desiccant portion of the filter assembly and the holding vessel to which it is connected.

BRIEF DESCRIPTION OF THE DRAWINGS

While the specification conclude with claims particularly pointing out and distinctly claiming the subject matter which is regarded as the invention, it is believed that invention will be better understood from the following description of a preferred embodiment taken in conjunction with the accompanying drawings in which:

DESCRIPTION OF A PREFERRED EMBODIMENT

Figure 1:
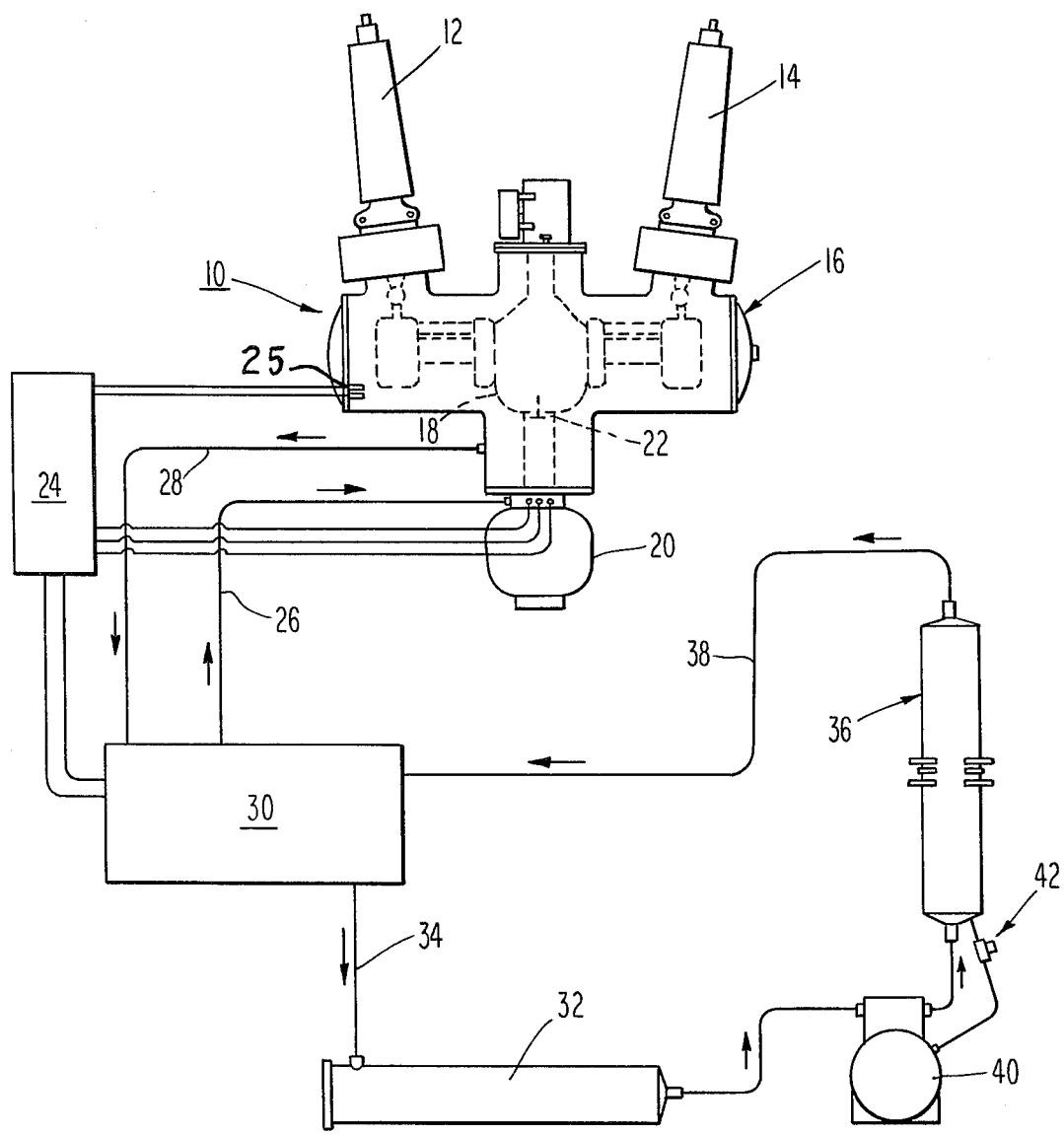
FIG. 1 illustrates a two-pressure circuit breaker and associated gas system.

A circuit breaker generally indicated at 10 includes a pair of high voltage insulator bushings 12, 14; a pressure-tight vessel or tank 16; a circuit interrupting assembly disposed within the tank, shown in phantom form at 18; and a high pressure gas reservoir vessel 20. Reservoir 20 is coupled to the circuit interrupter by means of a conduit in which is inserted a mechanically-operated valve 22. Appropriate gauges and pressure switches form the apparatus in control 24, it being recognized that certain of the pressure switches and other apparatus may be disposed at different points in the physical system. Pressurized gas enters vessel 20 through high pressure line 26, and low-pressure, dispensed gas is collected from within tank 16 by way of line 28. The gas passes through a bank of valves schematically illustrated at 30, and which is connected to a low-pressure filter 32 by conduit 34 and to a high pressure filter 36 by means of conduit 38. A motor-driven compressor 40 is disposed between the filter systems. An oil return line 42 having a valve therein serves to return oil collected in filter 36 to the motor and compressor system.

In operation arc quenching gas, commonly $SF_6$, is maintained in high pressure vessel 20 at a high pressure, approximately 250 psi. Further, tank 16 is exhausted of air and filled with the $SF_6$ gas, maintained at a lower pressure such as 40 psi. When the circuit breaker is actuated, the linkage which urges the contacts apart also serves the open valve 22. The pressurized gas in vessel 20 is than allowed to flow through passages in the interrupter (not shown) and forms a powerful jet of gas across the opening contacts. In this manner, an electric arc which has been drawn between the contacts is literally blown out by the jet of gas.

After valve 22 closes, there is typically enough pressurized gas left in vessel 20 to allow several more arc interruption cycles to occur. However, due to the limited capacity of the vessel it is necessary to re-collect the expelled gas, pressurize it and return it to vessel 20.

The rise in pressure within tank 16 due to the injection of high pressure gas from reservoir 20 is sensed by pressure sensors 25. In response thereto, appropriate ones of valves 30 are opened, and the motor which drives compressor 40 is activated. The compressor now begins to draw gas from tank 16 through outlet conduit 28. The gas flows through appropriate one of valves 30 to conduit 34, and into low-pressure filter 32. The gas is than pumped through compressor 40, and into the high-pressure filter 36. The filtered, pressurized gas passes outwardly through conduit 38, through valve 30 and into vessel 20 by means of line 26.

Lubricating oil which is inevitably on the internal components of circuit breaker 10, products of the electric arcs which are struck therein, and other impurities are absorbed by the arc quenching gas within tank 16. Coarser impurities are filtered from the low-pressure gas in filter 32. After the gas is compressed, however, many previously-vaporized impurities are left. The heavier of these are removed in the first stages of filter 36, while the remaining, finer elements are removed by the desiccant portion of filter 36 before the gas is returned to reservoir 20.

Figure 2:
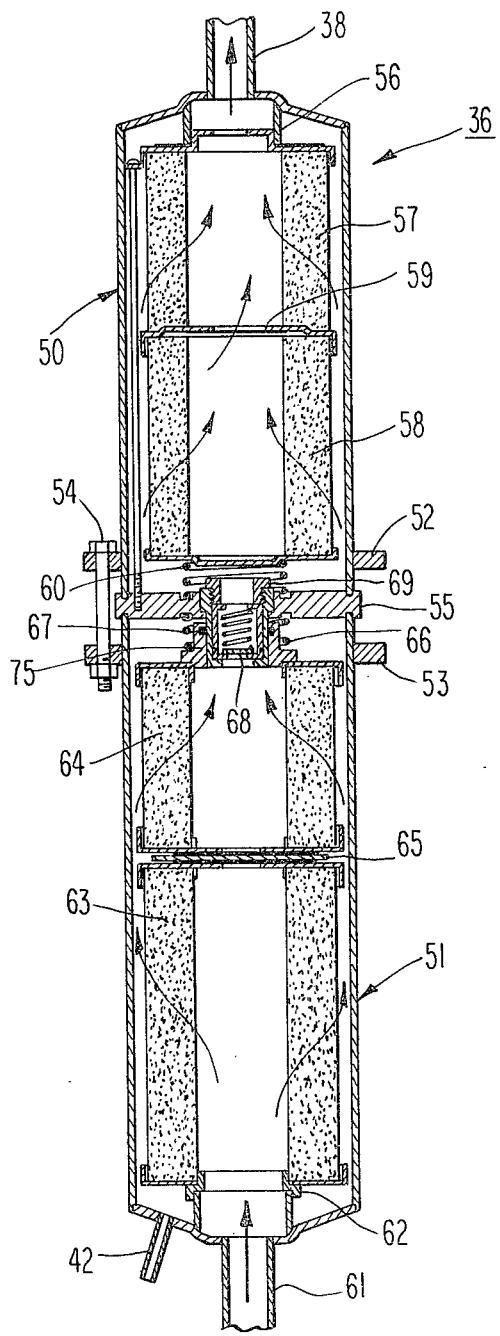
FIG. 2 is as cross-sectional diagram of a unitary filter constructed in accordance with the invention.

FIG. 2 shows in further detail the structure of filter 36. The filter includes upper and lower casing portions 50 and 51, each of which terminates at an open end having flanges 52 and 53 respectively affixed to it. Bolts 54 extend through the flanges, compressing casing portions 50 and 51 tightly together. A rigid partition 55 is provided with grooves and gaskets (not shown) and receives the open end of casing portions 50, 51 in sealing relationship.

At upper end of the filter, abutment 56 bears down upon first and second desiccant filter elements 57, 58. A plate 59 having an opening generally in the center thereof is disposed between filters 57, 58. A first coil spring 60 is in compression between the lower end of dessicant filter 58 and the upper surface of partition 55, and urges the two abutting filter elements 57, 58 against the upper end of the filter casing.

At the lower end of the casing, gas from compressor 40 enters through a conduit 61. An oil return line 42 is also provided for returning accumulated oil to the compressor system. A flange 62 supports oil filter elements 63, 64 above the end of the filter casing, thus providing a trough which oil may be collected.

As in the upper half of the casing, an imperforate baffle 65 is disposed between upper and lower oil filter elements 64, 63. A second coil spring 66 is disposed between the lower surface of partition 55 and a flange element 75 which abuts the uppermost oil filter, to urge the oil filter elements downwardly against the bottom of the filter assembly.

The check valve assembly in divider 55 is comprised of a first threaded sleeve 67 within which is spring-loaded plate or the like 68. The assembly is held in place by a flanged, threaded nut 69 which screws into the upper surface of partition 55.

With the system in operation, gas compressed in the system compressor is forced through conduit 61 and into the lowermost end of the filter assembly 36. Owing to the presence of baffle 65, the gas is forced outwardly through the sides of filter 63, as shown. The gas than travels upwardly, and pentrates the sides of upper oil filter element 64, as shown by the arrows, urging plate 68 open and flowing into the upper portion of the filter assembly. As oil is collected by the filters, it drips down to the bottom of the filter assembly and runs through line 42, through a normally-open solenoid valve and into an appropriate oil-receiving reservoir in compressor 40 (not shown).

After passing through the check valve assembly the substantially oil-free arc quenching gas flows inwardly through the sidewalls of first and second desiccant filters 57 and 58. The gas exits through the upper end of the system, through conduit 38 and valve system 30 and ultimately to high pressure reservoir 20.

The construction of the partition 55 is of particular interest, as it allows both oil and desiccant filters to be brought together as a single enclosure without the need for separate valves, piping, and the like.

Figure 3:
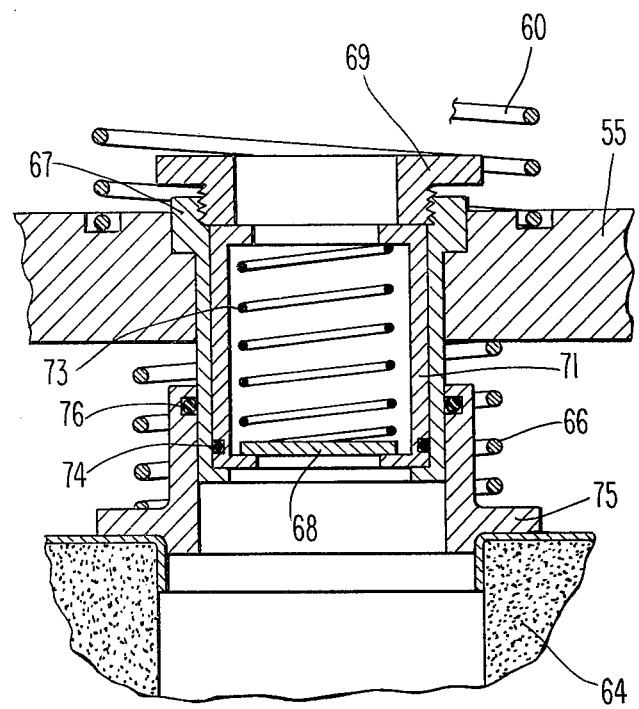
FIG. 3 is an enlarged section of a portion of the apparatus shown in FIG. 2.

Refering now to FIG. 3, the check valve assembly and adjacent parts are shown in further detail. A sleeve 67 is fitted in a counterbored hole extending through divider 55, and is welded or otherwise secured in place. An annular step is provided about the bottom of the sleeve, and receives the bottom of a check valve comprised of a body portion 71, plate 68 and spring 73. The check valve is held in place by a nut 69 which mates with internal threads in the upper portion of sleeve 67. 0-ring 74 provides a fluid-tight seal between sleeve 67 and the outer casing 71 of the check valve.

A sliding pressure flange 75 is fitted about the protruding end of sleeve 67, and provided with an 0-ring 76. Flange 75 fits within the uppermost end of oil filter 64. A coil spring 66 abuts the lower surface of divider 55, and bears on flange 75, thus urging the filter elements 63, 64 downwardly against the bottom end of the filter assembly enclosure. A groove in the upper surface of partition 55 receives pressure spring 60, which bears against the desiccant filter elements and forces them against the uppermost end of the filter assembly.

When compressor 40 stops, plate 68 closes so that the upper half of the filter assembly retains the pressure in vessel 20, while the lower half is at a lower pressure. When it is necessary to replace or repair the filter elements, appropriate ones of the valves 30 are closed, isolating the filter assembly 36. Bolts 54 are removed and the filter assembly separated, partition 55 being easily removed for cleaning and inspection. Further, the check valve assembly can be easily disassembled simply by removing nut 69. Upon reassembly, the filter elements are placed in their respective ends of the filter casing, springs 60 and 66 compressed as the housing are brought together at opposite sides of partition 55, and bolts 54 replaced and tightened.

It will now be seen that the present invention comprises an improved high-pressure gas filter assembly which is simple and more economical to manufacturer to maintain than those of the prior art, and further comprises and integral check valve which serves to maintain the pressure differential in the filter system during quiescent periods. It will be evident from the foregoing description that certain aspects of the invention are not limited to the particular details of the example illustrated, and it is therefore contemplated that other modifications or applications will occur to those skilled in the art. It is accordingly intended that the appended claims shall cover all such modifications and applications as do not depart from the spirit and scope of the invention.

What is claimed as new and desired to be secured by Letters Patent of the United States is:

1. In a system for pressurizing arc-quenching gas for an electrical current interrupter, a filtering assembly comprising:

a tubular casing having first and second portions, said first and second portions having distal ends having inlet and outlet conduits respectively coupled thereto and open, confronting ends;

a separable, rigid partition disposed transversely between said casing portions and receiving the open ends thereof in pressure-sealing relationship;

flange means coupled to said confronting ends of said filter casing portions;

tension means bridging said flange means for drawing said casing portions toward one another, and into pressure sealing contact with said partition;

an oil filter means disposed in said first casing portion;

a desiccant filter means disposed in said second casing portion;

spring means disposed on either side of said partition for urging said oil filter and said desiccant filter against the distal ends of said first and second casing portions, respectively;

a sleeve projecting from one side of said partition;

check valve means disposed in said sleeve for maintaining a higher pressure in said second portion than in said first portion; and a second flange means slidably disposed over said sleeve and receiving said spring means for urging one of said filters against the distal end of its respective filter casing portion.

2. The system as defined in claim 1, wherein said oil filter means and said desiccant filter means each comprises at least two axially aligned tubular filter elements, and baffle means disposed between two of said filter elements to cause arc quenching gas to flow through successive filter elements in different directions.

3. The system as defined in claim 1, wherein said check valve means comprises;

a threaded sleeve fixedly disposed in said partition and at least partly projecting therefrom;

a spring-biased check valve slidably disposed in said sleeve;

an apertured, threaded nut engaging one end of the threaded sleeve and abutting said check valve means;

a flange slidably disposed about the projecting end of the said sleeve; and a coil spring concentrically disposed about said flange and engaging one side of said partition means.

* * * * *